(Model.)
W. P. BETTENDORF.
WHEEL.
No. 325,585. Patented Sept. 1, 1885.
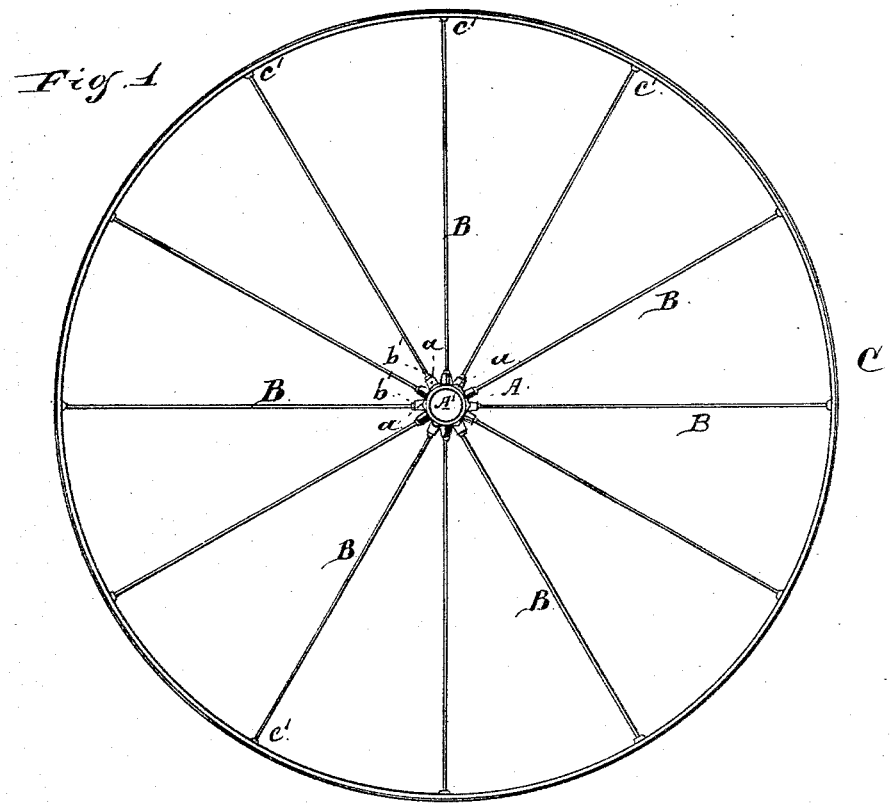
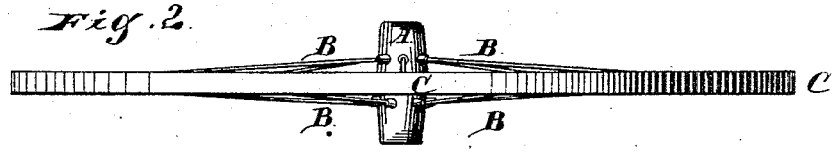
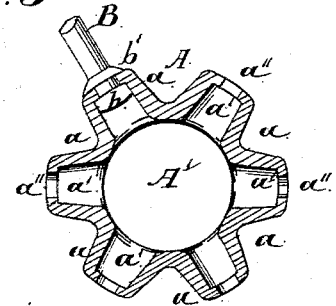
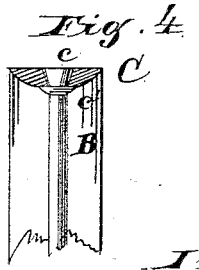
Witnesses:
Albert H. Adams.
Edgar J. Bond.
Inventor:
William P. Bettendorf
By West & Bond Attys.

UNITED STATES PATENT OFFICE.

WILLIAM P. BETTENDORF, OF PERU, ILLINOIS, ASSIGNOR TO HIMSELF AND THE PERU CITY PLOW COMPANY, OF SAME PLACE.

WHEEL.

SPECIFICATION forming part of Letters Patent No. 325,585, dated September 1, 1885.

Application filed August 24, 1883. (Model.)

*To all whom it may concern:*

Be it known that I, WILLIAM P. BETTENDORF, residing at Peru, in the county of La Salle and State of Illinois, and a citizen of the United States, have invented a new and useful Improvement in Wheels, of which the following is a full description, reference being had to the accompanying drawings, in which—

Figure 1 is a side elevation; Fig. 2, an edge view; Fig. 3, a section through the hub, showing one spoke in place and broken off; Fig. 4, a detail, being a section of the tire, showing one spoke in place and broken off.

This invention relates to that class of wheels in which the ends of the spokes alternately come on each side of the center line of the hub, the hub, spokes, and tire being all made of metal; and the object of the invention is to secure the ends of the spokes in the hub in a simple and reliable manner, so as to have the complete wheel very strong and firm. This is accomplished by the novel construction of wheel hub and spokes, hereinafter described and claimed.

In the drawings, A represents the hub, which may be made of malleable iron or other suitable metal, having a central longitudinal opening, A', for the spindle of the axle, and having on its exterior face on each side of a central line a row of tubular projections, a, arranged as shown in Figs. 1 and 2, or other analogous manner, each tube or boss having a socket or cavity, a', on its interior, and an opening, a'', leading from the interior to the exterior, as shown in Fig. 3, the opening a'' being of sufficient diameter for the passage of the end of the spoke.

B are the spokes formed of metal rods, either wrought-iron or other suitable material, and of the required length for the size of the wheel and for the formation of the rivet-head.

C is the tire, which may be of the shape in cross-section shown in Fig. 4, or of some other suitable shape having the required openings for the passage of the spoke ends, which openings, as shown, taper from the exterior toward the interior.

In manufacture the hub is to be cast as usual and the spokes cut for the required length, and the tire welded or united together and provided with openings for the passage of the spoke ends. The hub end of each spoke, after being brought to a red heat or a heat sufficient for the easy formation of the rivet-head, is inserted in its boss or tube a, and by means of a suitable clamp is held firmly in position, while its inner end is struck or riveted down so as to form a rivet-head, b, as shown in Fig. 3, and at the same time a bead or rim, b', is formed on the exterior end of the tube or boss, the clamp which holds the spoke being suitably formed for this purpose, the result being that the end of the spoke is secured in place by the rivet-head on the interior and the bead or flange on the exterior and in close contact with the end of the tube or boss a, so as to be secure from any play, and at the same time the metal of the spoke between the rivet-head and the flange which comes within the opening a'' is upset so as to fill the opening, and this operation is repeated with each spoke until the hub is filled. The spokes being heated as they are inserted and secured in place in the hub and in the tire, are lengthened somewhat, and as they become cool they contract, drawing against the tire and against the hub, so that they will be strained, and the wheel as a whole will be very much stronger and firmer than with the usual practice of making such wheels by the use of spokes having screw-threaded ends which enter the hub and the tire, and are secured by means of jam-nuts.

It is evident that the confining-flanges can be formed with the ends of the spokes cold, to do which all that is necessary is to use a heavier power or blow.

I do not claim a metal wheel having its spokes secured in place by enlargement in the mortises with a bead or flange on the exterior of the hub without a rivet or head on the end of the spokes inside of the hub.

What I claim as new, and desire to secure by Letters Patent, is—

1. A hub, in combination with spokes secured in position by a rivet-head within the interior of the hub, and a flange or bead on the exterior, substantially as described.

2. In a wheel, the combination of the hub constructed with tubular projections $a$, with the spokes B, secured in the projections by inner and outer flanges, between which the walls of the projections closely fit, substantially as described.

WILLIAM P. BETTENDORF.

Witnesses:
W. F. CRONISE,
W. K. HOAGLAND.